United States Patent [19]
Iijima

[11] Patent Number: 5,369,760
[45] Date of Patent: Nov. 29, 1994

[54] DATA PROCESSING SYSTEM

[75] Inventor: Yasuo Iijima, Yokohama, Japan

[73] Assignee: Kabushiki Kaisha Toshiba, Kawasaki, Japan

[21] Appl. No.: 26,819

[22] Filed: Mar. 5, 1993

[30] Foreign Application Priority Data

Mar. 6, 1992 [JP] Japan ................... 4-049582

[51] Int. Cl.$^5$ .................. B29C 33/40; G06K 5/00
[52] U.S. Cl. ................... 395/575; 364/222.2; 235/382
[58] Field of Search ............. 395/575; 371/60, 57.1; 235/382, 379, 380; 364/222.2, 284

[56] References Cited

U.S. PATENT DOCUMENTS

| 4,841,131 | 6/1989 | Iijima . | |
|---|---|---|---|
| 4,845,717 | 7/1989 | Iijima . | |
| 4,901,276 | 2/1990 | Iijima . | |
| 4,939,353 | 7/1990 | Iijima | 364/200 |
| 5,093,785 | 3/1992 | Iijima | 364/200 |
| 5,202,923 | 4/1993 | Kuriyama | 371/21.1 |
| 5,248,924 | 9/1993 | Niwa . | |

FOREIGN PATENT DOCUMENTS 2655170  5/1991  France .

OTHER PUBLICATIONS

Naoki Matsuo 'Personal Telephone Services Using IC-Cards 1990 IEEE pp. 41-48.
Richard A. Williams, "Communication Systems Analysis and Design-A System Approach", Prentice-Hall Inc., USA, 1987, pp. 406-410.

*Primary Examiner*—Robert W. Beausoliel, Jr.
*Assistant Examiner*—Albert Decady
*Attorney, Agent, or Firm*—Cushman, Darby & Cushman

[57] ABSTRACT

In a system for serially transmitting data between a card reader/writer and an IC card, when a data string is transmitted from the card reader/writer to the IC card, the data row is divided into a plurality of data strings. Data (control code) representing continuity of data transmission is added to each of the divided data strings. When a data string is transmitted from the IC card to the card reader/writer, the data string is divided into a plurality of data strings. IC card encodes the divided data string, and transmits the encoded data with the data (control code) representing continuity of data transmission is added to the encoded data string. Data transmission between the card reader/writer and the IC card is controlled such that the divided data string and encoded data string are alternately transmitted in units of one.

8 Claims, 8 Drawing Sheets

DATA PROCESSING SYSTEM

BACKGROUND OF THE INVENTION

1. Field of the Invention

This invention relates to a data processing system, and more particularly to a data processing system applied to data communication which employs serial transmission protocols between a card reader/writer and an IC card connected thereto.

2. Description of the Related Art

Recently, IC cards incorporating an IC chip have been developed as new portable data storage media, for example, as disclosed in U.S. Pat. No. 4,845,717. The IC chip includes a nonvolatile data memory and a control element such as a CPU for controlling the data memory.

The IC card is generally connected to a card reader/writer and operated in accordance with instruction data supplied from the card reader/writer. More specifically, the IC card receives instruction data from the card reader/writer and decodes a function code (instruction code) in the received instruction data. The IC card performs a process corresponding to the function code and the process result is returned to the card reader/writer as response data.

Conventionally, a block transmission protocol has been considered as a protocol for use in IC cards. In general, an IC card has a buffer memory for inputting and outputting data. When a data string longer than the size (capacity) of the buffer is to be transferred, the data string is divided into a plurality of sections, which are smaller than the buffer size, by using the known chaining function. Thereafter, the sections of the data string are successively transmitted to the IC card.

The conventional chaining function can be applied only to data transmission in one direction. For example, assume that a data string longer than the buffer size of an IC card is transmitted from a card reader/writer to the IC card, encoded in the IC card, and thereafter used in the card reader/writer. In this case, the IC card encodes sections of the data string successively supplied form the card reader/writer, and an additional memory is required to temporarily store the encoded results until all the sections of data string supplied from the card reader/writer are completed.

SUMMARY OF THE INVENTION

It is accordingly an object of the present invention to provide a data processing system which allows a data string including, for example, redundant data to be successively encoded using only a minimum buffer memory.

According to a first aspect of the present invention, there is provided a data processing system for serially transmitting data between first and second electronic devices. The first electronic device comprises first processing means for, when a data row is to be transmitted, dividing the data row into a plurality of data strings and transmitting the divided data strings together with information representing continuity of the data. The second electronic device comprises second processing means for processing the divided data strings and transmitting the processed results together with information representing continuity of the data. The second electronic device also comprises control means for controlling the first and second processing means when the divided data strings are transmitted therebetween such that the divided data strings are alternately received and transmitted at least once by the first and second processing means.

According to a second aspect of the present invention, there is provided a data processing system for transmitting instruction data from first electronic device to a second electronic device which performs a processing based on the instruction data. The processed result is then returned to the first electronic device. The second electronic device comprises a first processing portion for receiving first instruction data from the first electronic device, performing a processing based on the first instruction, and storing data indicating that the processing has been completed. The second electronic device also comprises determining means for, when the second electronic device receives a second instruction data from the first electronic device, determining whether the processed result has been completed based on the first instruction. The second electronic device still further comprises a second processing portion for, when the determining means determines that the processing based on the first instruction has been completed, performing a processing based on the second instruction data and returning the processed result to the first electronic device.

According to the first aspect of the present invention, when a data string is transmitted between two devices using the conventional serial transmission protocols, the data string is divided into a plurality of data strings, which are transmitted together with continuity of data transmission. Since the system is controlled such that the divided data strings are alternately transmitted and received by the two devices, a high speed application processing can be performed as if the data strings were processed in parallel. Therefore, if, for example, a data string including redundant data is to be encoded, it is unnecessary to store the encoded results in a memory of a relatively large capacity, unlike in the conventional apparatus. Thus, data strings can be successively encoded by using a minimum buffer memory.

According to the second aspect of the present invention, data transmission in two directions can be continuously performed by using the conventional serial transmission protocol which enables continuous data transmission only in one direction. For this purpose, when instruction data including continuity of data transmission is received and a processing based thereon has been completed, data which represents that the processing has been completed is stored. When the next instruction data is received, the continuity of data transmission is confirmed by checking whether the instruction data which has been processed immediately before represents the continuity of data transmission. Thus, even if a data string exceeding the capacity of the buffer memory is to be encoded, it is unnecessary to provide an additional memory for temporarily storing the encoded result.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

Embodiments of the present invention will now be described with reference to the accompanying drawings.

Figure 1:
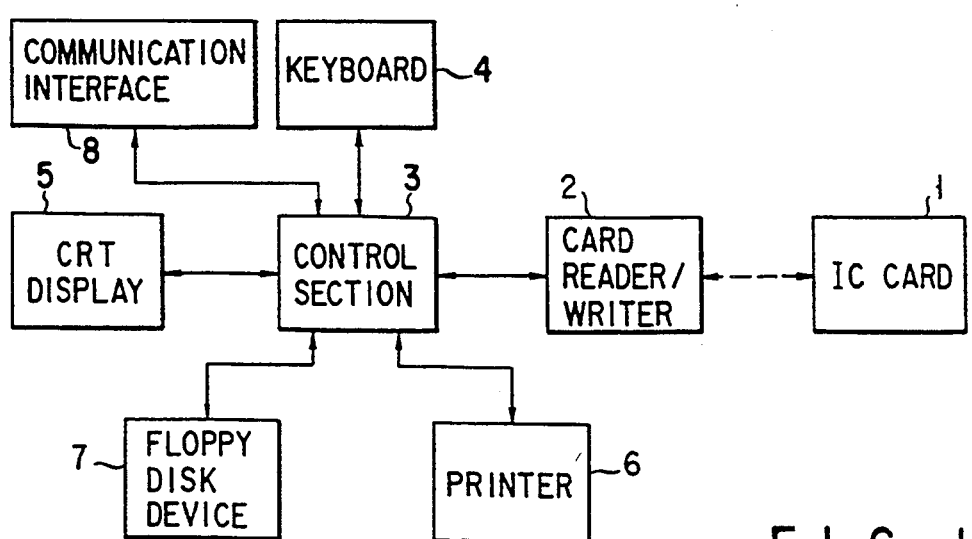
FIG. 1 is a block diagram showing a terminal device.

FIG. 1 shows the structure of a terminal apparatus for processing an IC card according to the present invention. The terminal apparatus has a control section 3, including a CPU, four controlling the entire terminal apparatus. The control section 3 is connected to a card reader/writer (first electronic device), a keyboard 4, a CRT display 5, a printer 6, a floppy disk device 7, and a communication interface 8. An IC card (second electronic device) 1 is connected to the control section 3 through the card reader/writer 2.

Figure 2:
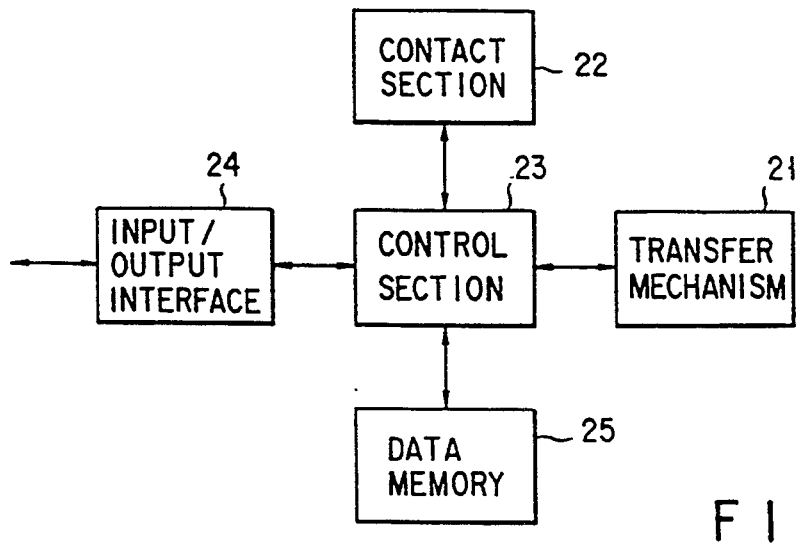
FIG. 2 is a block diagram showing the card reader/writer shown in FIG. 1.

The card reader/writer 2 allows transmission of data and function codes between the IC card 1 and the control section 3. It also causes the IC card 1 to perform a one-instruction, one-response operation in accordance with a macro instruction from the control section 3. FIG. 2 shows a specific structure of the card reader/writer 2. The card reader/writer 2 includes a transfer mechanism 21 for transferring the IC card inserted into a card insertion port (not shown) to a predetermined position, a contact section 22 which is brought into electrical contact with a contact section 18 of the IC card 1 set to the predetermined position, a control section 23 including a CPU for controlling the entire card reader/writer, an input/output interface 24 for transmitting instruction data and response data between the control sections 23 and 3, and a data memory 25 for storing data.

Figure 4:
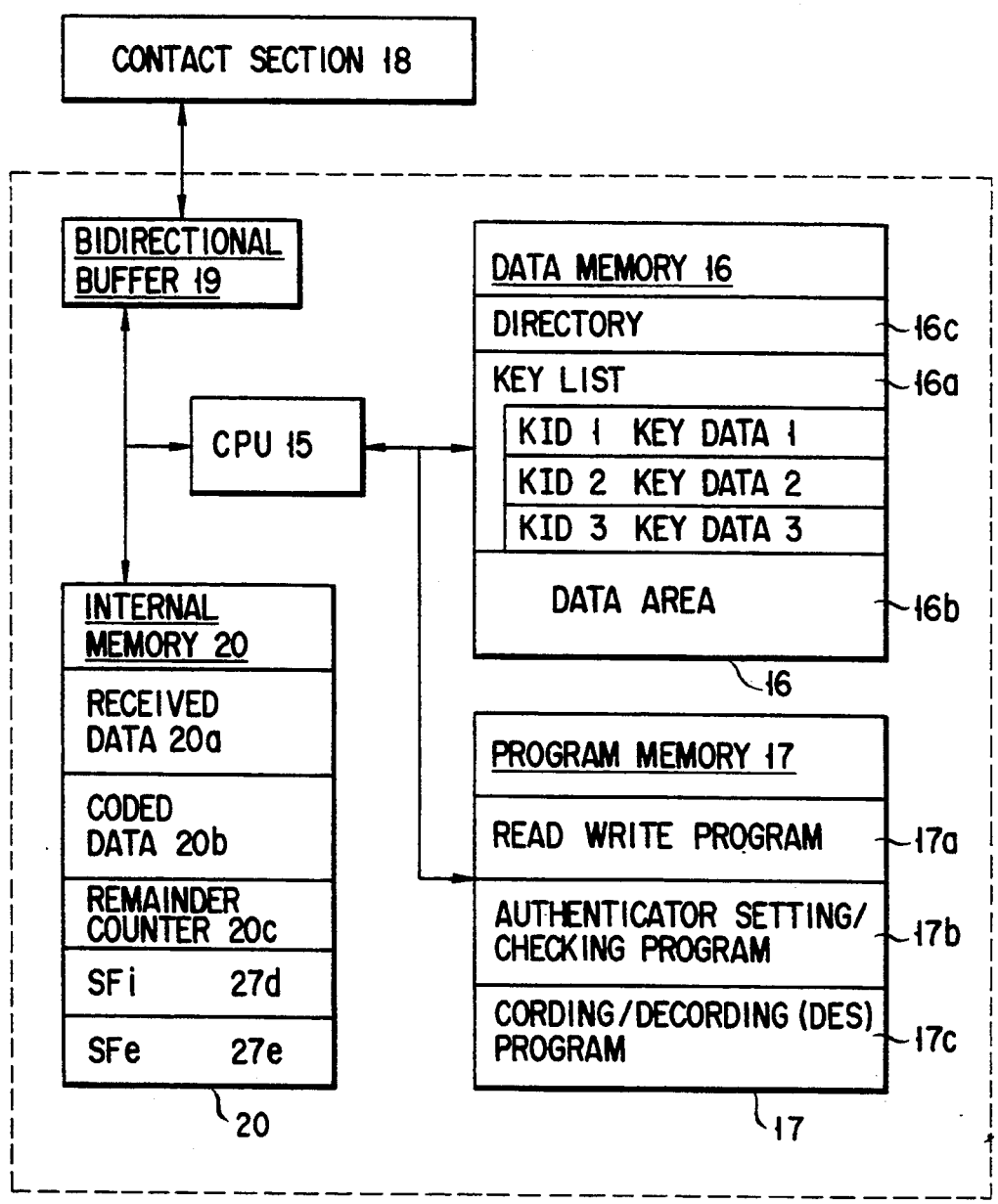
FIG. 4 is a block diagram showing hardware of the IC card.

The CPU 23 performs transmission/reception of instruction and data with the CPU 15 shown in FIG. 4 by way of the contact section 22. Data to be sent to the IC card 1 is divided into a predetermined number of processing unit bytes by the CPU 15.

Figure 3:
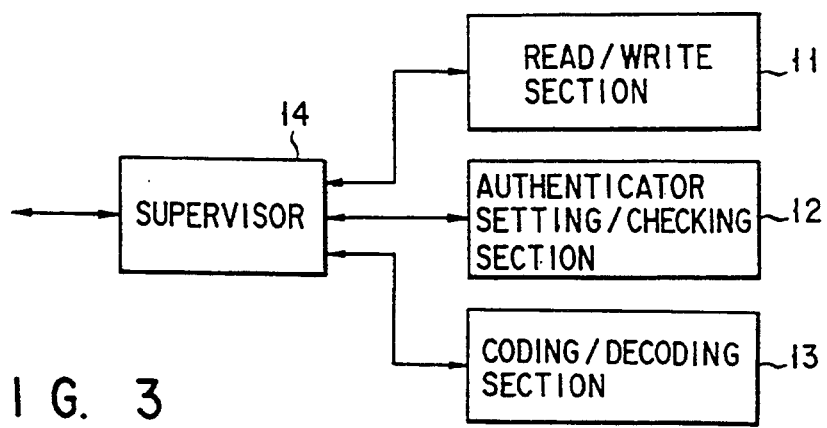
FIG. 3 is a diagram showing function blocks of an IC card.

FIG. 3 is a block diagram showing functions of the IC card 1. The IC card 1, held by a user, is used to store various data and to check the authenticator which only the user knows, during the purchase of goods. As shown in FIG. 3, the IC card 1 is constituted by a basic function portion which includes a read/write section 11, an authenticator setting/checking section 12, and a coding/decoding section 13, and a supervisor 14 which manages the basic functions.

The read/write section 11 writes/reads and deletes data in/from a data memory (to be described later).

The authenticator setting/checking section 12 stores an authenticator which the user sets, verifies the authenticator, and determines whether data reading is prohibited or permitted.

The coding/decoding section 13 encodes and decodes data to prevent leakage or counterfeiting of data, when, for example, data is transmitted from the control section 3 to another terminal through the communication interface 8. The coding/decoding section 13 processes data in accordance with an encryption algorithm such as DES (Data Encryption Standard) which has sufficient strength.

The supervisor 14 decodes a function code supplied from the card reader/writer 2 (shown in FIG. 1) or a function code to which data is added, and selects and executes one of the above-described basic functions.

FIG. 4 shows an example of hardware of the IC card 1 for performing the above functions.

The IC card 1 includes a one-chip microcomputer constituted by a CPU 15, a data memory 16, a program memory 17 and the line, and a contact portion 18 for electrically connecting the IC card with the card reader/writer. The contact portion 18 is connected to a bidirectional buffer 19 for transmitting data between the contact portion 18 and an external device. The one-chip microcomputer includes an internal memory 20 used as a working memory of the CPU 15. The CPU 15 is connected to the bidirectional buffer 19 and the internal memory 20.

The data memory 16 includes a key list area 16a for storing keys to be used in an encoding process, a data area 16b for storing data, and a directory area 16c for storing the start address and the size of the data area 16b.

The program memory 17 is constituted by a mask ROM which stores various programs for operating the CPU 15, and includes a read/write program memory area 17a, an authenticator setting/checking program memory area 17b, and a coding/decoding program memory area 17c.

The internal memory 20 is used as a working memory and includes a received data memory area 20a for storing received data, a coded data memory area 20b for storing data coded (or decoded) by the CPU 15 using the program stored in the coding/decoding program memory area 17c, a remainder counter 20c for storing remainder of processed data, an internal sequence flag area (SFi) 20d, and an external sequence flag area (SFe) 20e.

Figure 5:
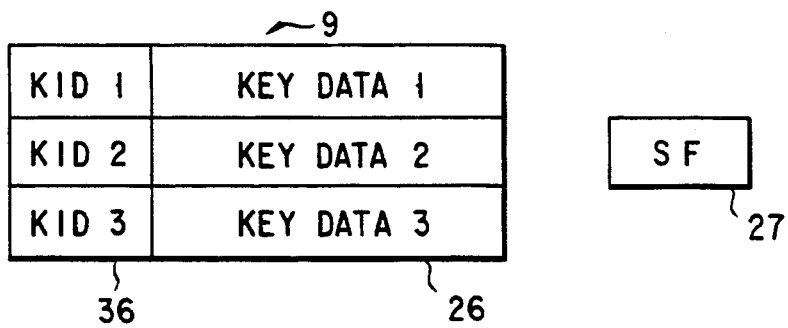
FIG. 5 is a key list in the data memory shown in FIG. 4.

FIG. 5 shows another construction of the data memory 16. The data memory 16 has a sequence flag 27 and a key list 9 including a plurality of identification data (KIDn) 36 (n=1, 2, 3 . . . ) and key data n 26. The sequence flag 27 indicates whether, prior to the current instruction data, relevant instruction data has been processed or not. If the flag is "1", this means that relevant instruction data has been processed. If the flag is "0", this means that no relevant instruction data has been processed.

Figure 6:
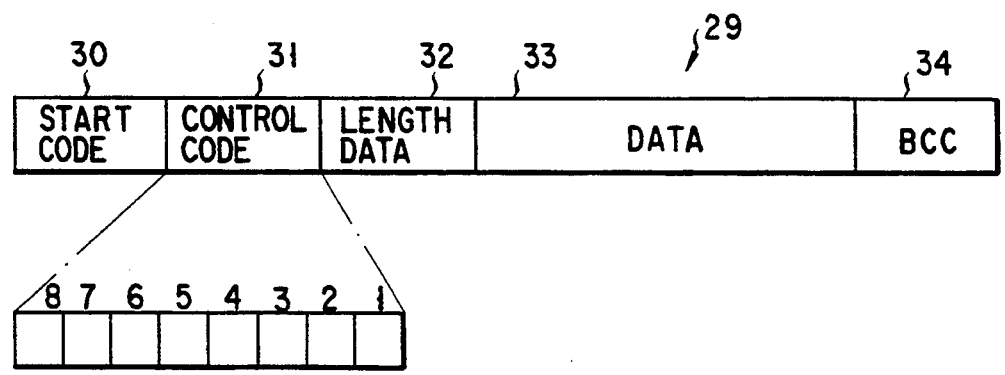
FIG. 6 is a diagram showing format of data to be transmitted.

FIG. 6 shows an example of data format of a data string 29 which is subjected to an encoding process and transmitted from card reader/writer 2 or IC card 1. The data format is constituted by a start code 30 representing the start of the message to be transmitted, a control code 31 representing the type of the message, a data portion 33 in which instruction or response data is recorded, length data 32 representing the length of the data portion 33, and an error detection code (BCC) 34 relating to these data.

Figure 7:
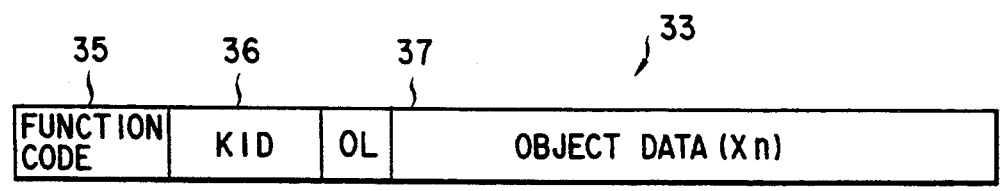
FIG. 7 is a diagram showing format of instruction data in the data portion shown in FIG. 6.
Figure 8:
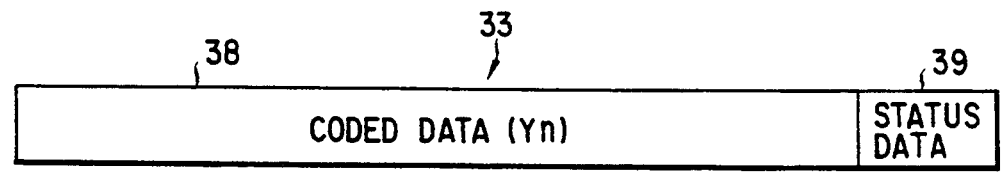
FIG. 8 is a diagram showing format of response data in the data portion shown in of FIG. 6.

Format of instruction data and response data of the data portion 33 will be described with reference to FIGS. 7 and 8. FIG. 7 shows format of instruction data, which is transmitted from card reader/writer 2, constituted by a function code 35 representing the function of the instruction, key identification data (KID) 36 for designating key data 26, and object data 37 of raw data string which is to be encoded. OL (object length) which represents the total length of all the divided data ($X_1, \ldots, X_n$) to be processed later is added to the object data 37. FIG. 8 shows format of response data, which is transmitted from IC card 1, constituted by coded data 38 and status data 39 representing the processed result. If process abnormality occurs, the response data includes only status data.

An encoding operation according to a first embodiment of the present invention will now be described with reference to the flowcharts shown in FIGS. 9 and 10. When the control element 15 of the IC card receives power supplied from the card reader/writer 2, it outputs an initial response (ST1). Then, the IC card stands by for input of instruction data (ST2).

The card reader/writer 2 divides a data row, which is to be encoded by the IC card 1, into a plurality of object data 37 in data string 29. The card reader/writer 2 transmits an initial message including the first one of the plurality of the object data.

When IC card 1 inputs instruction data, or data string 29 from the card reader/writer 2, the control element 15 determines whether the start code 30 (e.g. 3A in hexadecimal notation) is set in the instruction data, i.e., whether the instruction data is the initial message (ST3). If the instruction data is the initial message, the control element 15 checks the internal sequence flag (SFi) 27d in the data memory 16 (ST5). If the sequence flag 27d is "1", the control element 15 outputs response data representing sequence abnormality (ST10), since the object data 37 in the initial message is the first data of the divided data strings and no other data relating to the data can be processed before the first object data is input. Then, the control flow returns to the standby state for instruction data input (ST2).

If the sequence flag 27d is "0", the control element 15 extracts the function code 35 from the input instruction data, and determines whether the code 35 represents an encoding instruction (ST6). If the code 35 does not represent an encoding instruction, the flow advances to another data process. If it represents an encoding instruction, the control element 15 extracts a key identification data (KID) from the input instruction data and searches for a corresponding KIDn 36 from the key list 9 stored in the data memory 16 (ST7). If a corresponding KID is not found, the control element 15 outputs response data representing absence of the key (ST9), and returns to the standby state for instruction data input. In summary, authentication is verified in this step (ST7).

If a KID corresponding to that of the instruction data is present in the key list 9, the control element 15 extracts the object data 37 from the input instruction data, and sets the value of OL which represents the total length of divided data strings in the remainder counter 20c. The object data 37 is encoded in accordance with the key data 26 corresponding to the KID (ST11). The encoded data is stored in the buffer 19 (ST12). The control element 15 decrements the remainder counter 20c by "1", and checks whether a value of the counter 20c is "0" (ST13). In this way, the control element 15 checks whether all the data strings are encoded. If all the data strings are encoded, the control element 15 sets the sequence flag 27d to "0" (ST14). Then, the control element 15 outputs the encoded data stored in the buffer 19 and response data representing "completion of the process" (ST15), and returns to the standby state (ST2).

If all the data strings are not encoded, the control element 15 sets the sequence flag 27d to "1" (ST16), outputs the encoded data stored in the buffer 19 and status data 39 representing "in the process" as response data (ST17), and returns to the standby state (ST2).

In the step (ST3), if the input instruction data is not the initial message, the control element 15 checks the sequence flag 27d provided in the data memory 16 (ST4). If the sequence flag 27d is "0", the control element 15 outputs status data representing sequence abnormality as response data (ST10) and returns to the standby state (ST2). If the sequence flag 27d is "1", the flow advances directly to the above-mentioned process of encoding the object data 37. In summary, if the input instruction data is not the initial message and the sequence flag 27d is "1", the sequence (1) shown in FIG. 9 is not executed. Thus, reliable and quick processing is assured by using the sequence flag 27.

The following is description of a case where the above-described processing is executed by protocols. In this case, the divided data strings as shown in FIGS. 6, 7, and 8 are alternately transmitted (received) between the card reader/writer 2 and the IC card 1.

The control code 31 of the format shown in FIG. 6 consists of 8 bits, and the LSB (least significant bit) thereof is used to represent presence or absence of a subsequent message ("0" and "1" mean absence and presence of a subsequent message, respectively). It is noted that the function of the LSB differs from that of the sequence flag 27.

Data is transmitted by serial communication between the IC card 1 and the card reader/writer 2. In the conventional systems, as described above, instruction data strings are transmitted continuously (at a time) from the card reader/writer 2 to the IC card 1. In the IC card 1, the function code 35 is extracted from the instruction data and decoded. After a process corresponding to the decoded instruction data is performed, the processed results are transmitted continuously (at a time) to the card reader/writer as a series of response data strings. The instruction data and the response data are transmitted through the communication path in accordance with the procedures defined with protocols between the IC card 1 and the card reader/writer 2.

Figure 11:
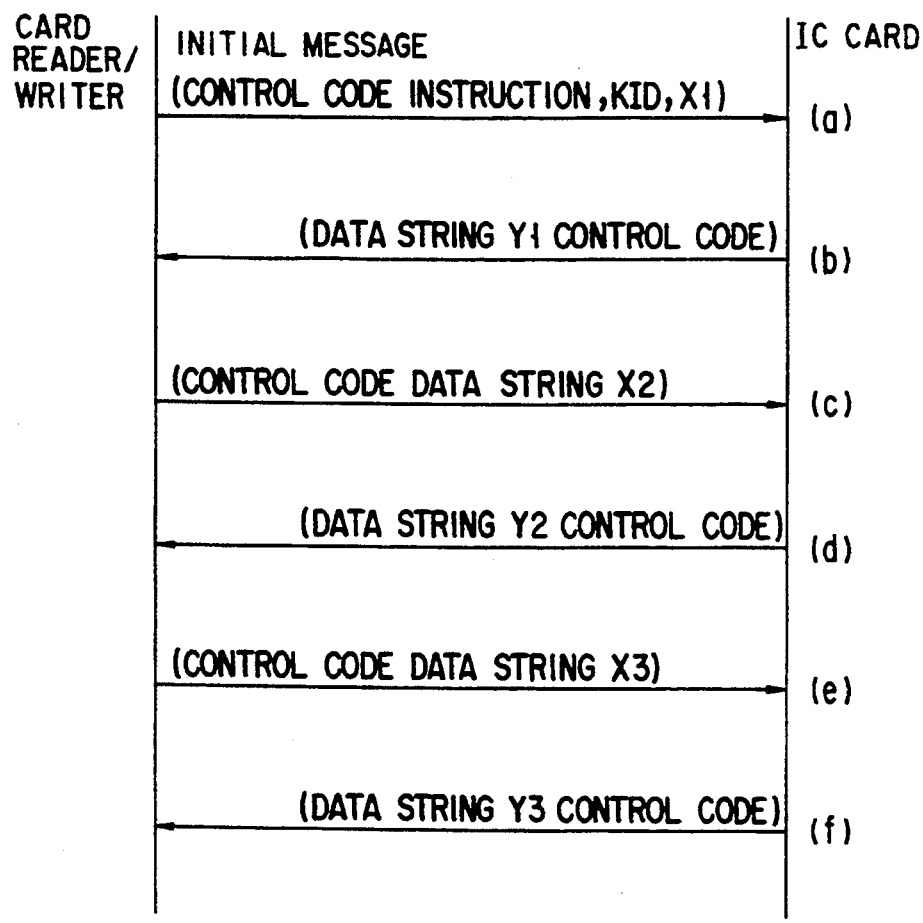
FIG. 11 is a diagram showing an example of transmission sequence between a card reader/writer and an IC card.
Figure 12:
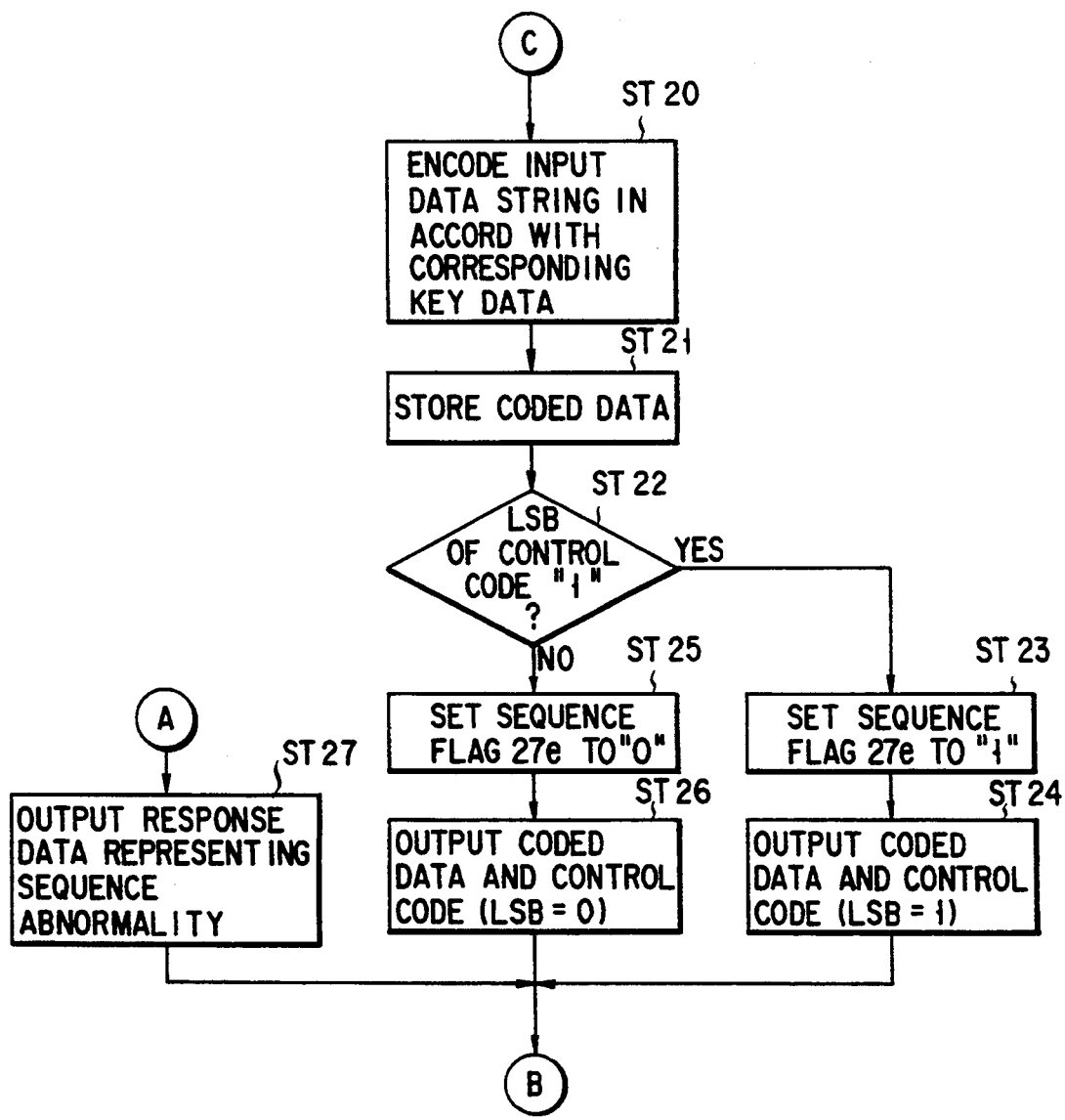
FIGS. 12 and 13 are flowcharts showing an operation according to second and third embodiments of the present invention, which are to be connected to the flowchart shown in FIG. 9.

FIGS. 11 and 12 show a second embodiment in which divided short messages are alternately transmitted (received) between the card reader/writer 2 and the IC card 1 by using the above protocols.

First, the card reader/writer 2 divides a data row, which is to be encoded in the IC card 1, into a plurality of object data (in this embodiment, three object data). The card reader/writer 2 transmits the initial message including a first data string $X_1$ to the IC card 1 (FIG. 11 (a)). At this time, the LSB of the control code 31 is set to "1". In this embodiment, the card reader/writer 2 instructs to execute an encoding process by using the LSB of the control code 31, representing whether a message is followed by another relevant message.

Figure 9:
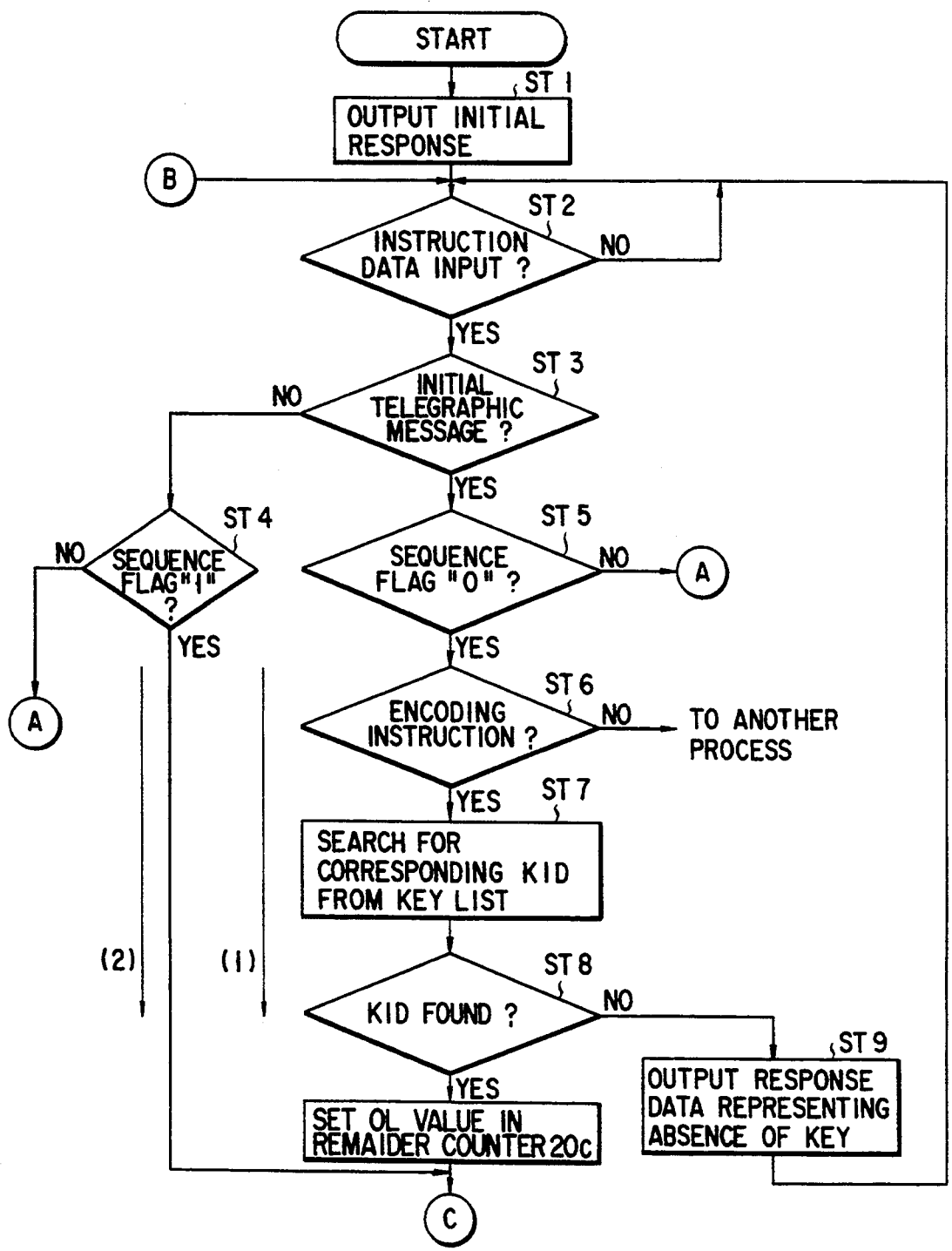
FIGS. 9 and 10 are flowcharts showing an operation according to a first embodiment of the present invention, in which the system of the invention is used in the coding process.
Figure 10:
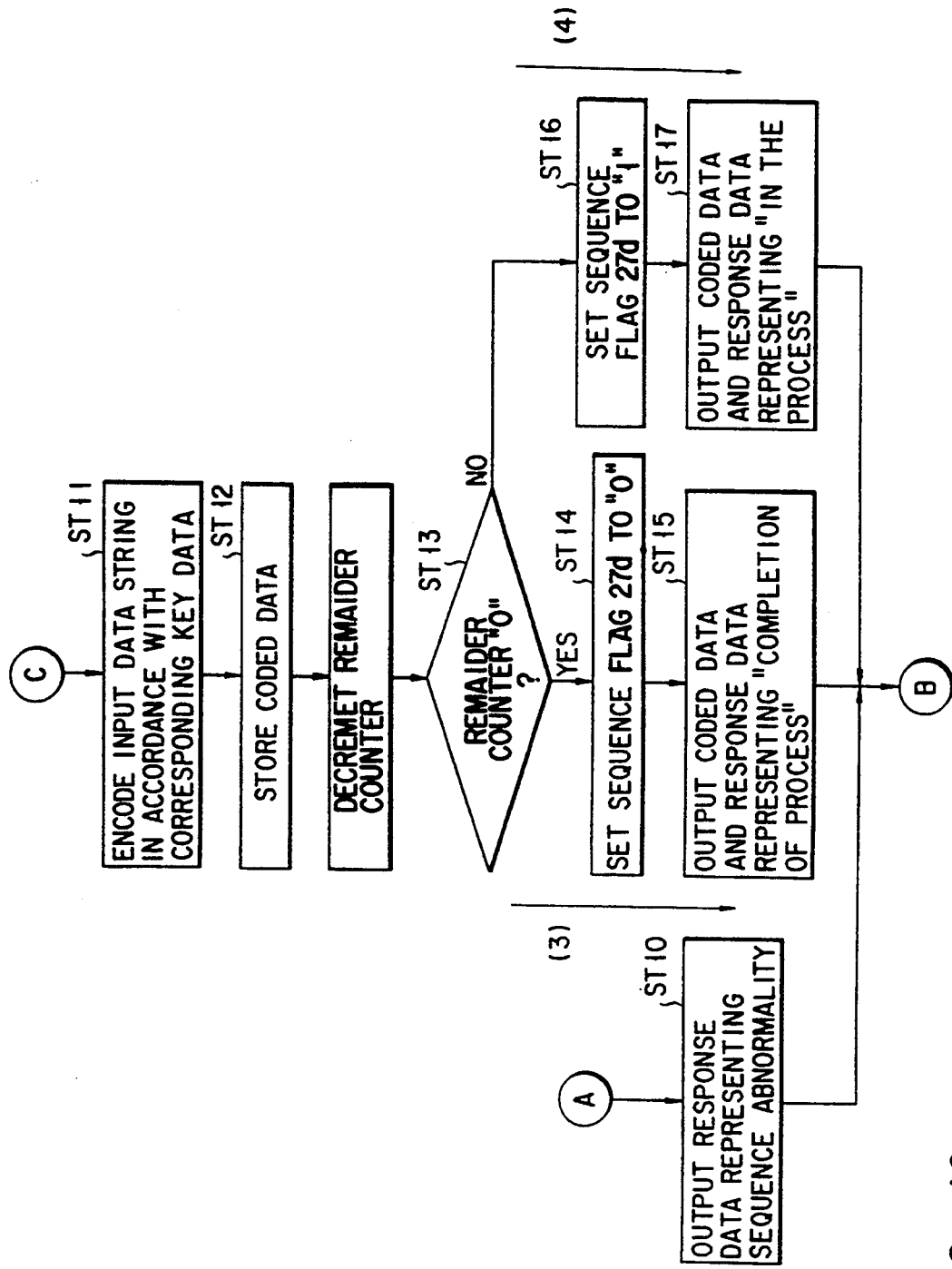

The IC card 1, upon reception of the initial message, executes the sequence (1) in the flowchart shown in FIG. 9 (in this case, however, sequence flag 27 means external sequence flag (SFe) 27e). Thereafter, the control flow advances to the steps shown in FIG. 12. The flowchart of FIG. 12 is similar to that of FIG. 10, although a step of processing the LSB of the control code 31 is added.

The IC card 1 encodes an input data string $X_1$ (ST20) and stores a resultant coded data $Y_1$ in the buffer 19 (ST21). Then, the IC card 1 checks whether all the data strings have been encoded with reference to the LSB of the control code 31 of the message transmitted from the card reader/writer 2 (ST22). More specifically, the LSB "1" of the control code 31 means that a relevant data string will be further transmitted from the card reader/writer 2. The LSB "0" means that all the data strings have been transmitted.

If the LSB is "1" ("YES" in step ST22), the IC card 1 transmits the coded data string $Y_1$ together with response data representing that encoded data will be successively transmitted (the LSB of the control code 31 is set to "1") to the card reader/writer 2 (ST24), after setting the sequence flag 27e to "1" (ST23), and the IC card returns to the standby state. This operation corresponds to FIG. 11 (b).

Next, the card reader/writer 2 sets the LSB of the control code 31 to "1", and transmits a message including a second data string $X_2$ to the IC card 1 (FIG. 11 (c)). The IC card 1, upon reception of this message, executes the sequence (2) in the flowchart shown in FIG. 9 (sequence flag 27 means sequence flag 27e). Thereafter, the IC card 1 encodes the input data string $X_2$ and stores resultant coded data $Y_2$ in the buffer 19. Then, the IC card 1 checks whether the LSB of the control code 31 is "1" (ST22). If the LSB is "1" ("YES" in step ST22), the IC card 1 transmits the coded data string $Y_2$ together with the message including response data representing that encoded data will be successively transmitted (the LSB of the control code 31 is set to "1") to the card reader/writer 2 (ST24), and the IC card returns to the standby state. This operation corresponds to FIG. 11 (d).

Subsequently, the card reader/writer 2 set the LSB of the control code 31 to "0", and transmits the final data string $X_3$ to the IC card 1 (FIG. 11 (e)). The IC card 1, upon reception of this data string, executes the sequence (2) in the flowchart shown in FIG. 9. Thereafter, the IC card encodes the input data string $X_3$ and stores resultant coded data $Y_3$ in the buffer 19. Then, the LSB of the control code 31 is checked. If the LSB is set to "0", the IC card 1 recognizes that all the data strings are encoded (ST22). Next, the IC card 1 transmits the coded data string $Y_3$ together with a message including response data representing that the process is completed (the LSB of the control code 31 is set to "0"), to the card reader/writer 2 (ST26), after setting the sequence flag 27e to "0" (ST25) and returns to the standby state. This operation corresponds to FIG. 11 (f). Therefore, the control element 15 control data transmission between the first and second electronic devices 2 and 1 such that the divided data 37 and encoded data 38 are alternately transmitted in units of one.

Figure 13:
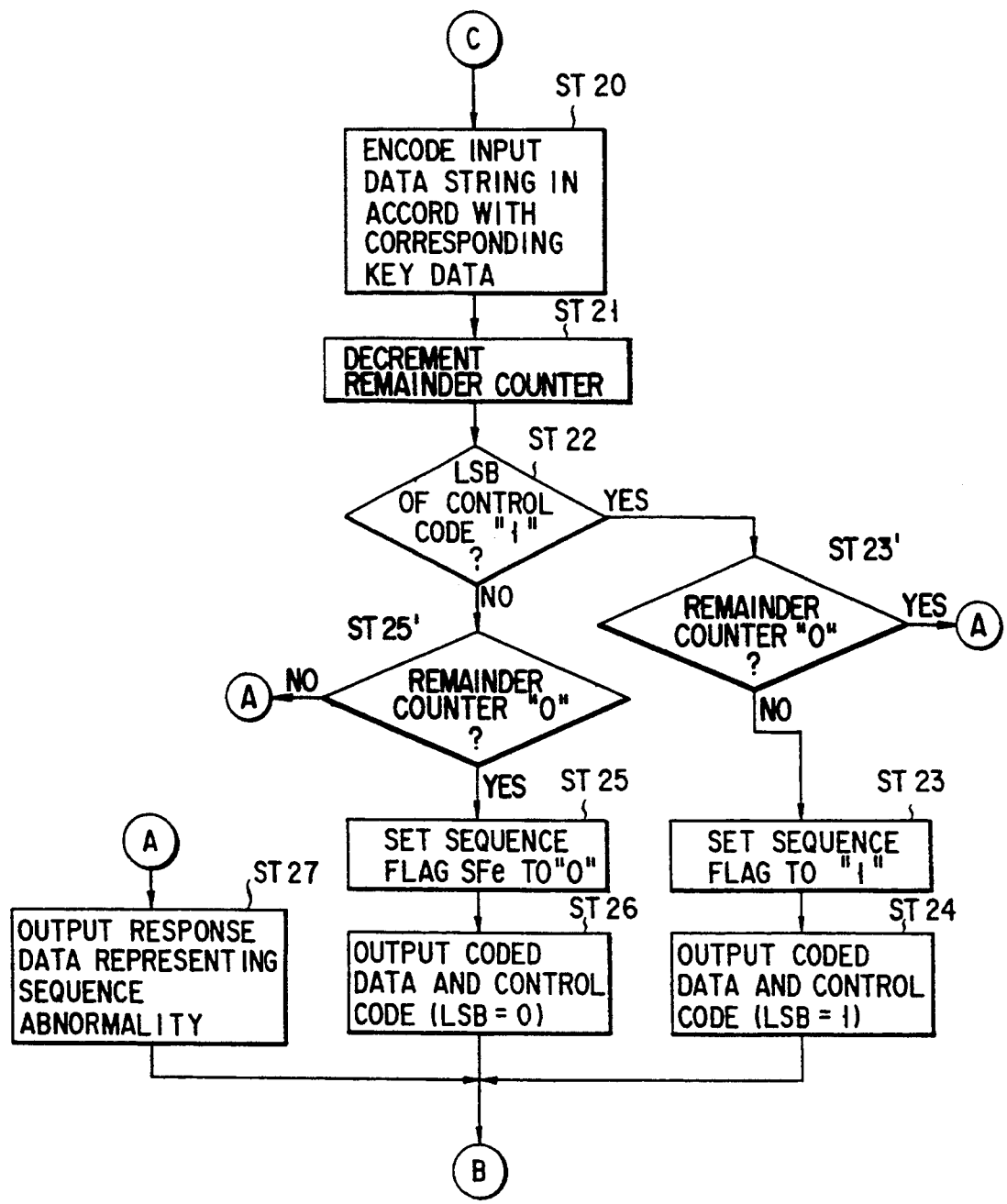

FIG. 13 shows a third embodiment of the present invention. This embodiment has the features of the first and second embodiments. More specifically, the IC card 1 checks the LSB of a control code transmitted from the card reader/writer 2 and determines by use of the remainder counter whether transmission of data strings from the card reader/writer 2 has been completed. For this purpose, the flowchart of FIG. 13 has a step of decrementing the value of the remainder counter (ST21') by one and a step of confirming the value of the remainder counter (ST25', ST23'), in addition to steps in the flowchart of FIG. 12.

Thus, if, for example, a data string is to be encoded, it is unnecessary to temporarily store the resultant encoded data in a memory of a relatively large capacity, unlike in the conventional apparatus. The data row is divided into a plurality of data strings which can be successively encoded by using a minimum buffer memory according to the invention. Further, since data strings divided on the protocol levels are transmitted in two directions, a high speed encoding process can be performed as if it were a parallel processing.

The above process can be performed on a command level, that is to use the function code 35 in the command data 33 to check whether a subsequent message is present, whereas on the protocol level, the LSB of the control code 31 is set to "0" to represent that there is no subsequent message. In this method, the card reader/writer 2 can recognize presence or absence of subsequent response data by using the status data 39 of the response data.

In the above embodiments, the first and second electronic devices respectively correspond to the card reader/writer 2 and the IC card 1. However, the present invention is not limited to the above embodiments. For example, the first electronic device can be the control section 3 and the second electronic device can be the card reader/writer 2.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data processing system for sequentially transmitting an instruction and data, said data being divided into a plurality of data strings which are sequentially transmitted between first and second electronic devices, wherein:

said first electronic device includes first transmission means for transmitting said instruction and a data string of said plurality of data strings together with first sequence data indicating that a next data string will be transmitted subsequently, and wherein said second electronic device includes:

means for processing said transmitted data string based on said transmitted instruction upon receipt of said transmitted data string, independent of receipt of further data strings, and for generating resultant data based on said processing;

means for determining whether a next data string will be transmitted from said first electronic device subsequent to said received data string; and second transmission means for transmitting said resultant data together with second sequence data to said first electronic device, said second sequence data indicating that next resultant data will be transmitted to said first electronic device when said determining means determines that a next data string will be subsequently transmitted, where said first transmission means transmits said next data string together with said first sequence data when said data string being transmitted is not a last data string in said plurality of data strings, and where said first transmission means transmits said last data string together with third sequence data, said third sequence data indicating that a next data string will not be transmitted subsequently.

2. System according to claim 1, wherein said determining means includes means for checking whether said first sequence data indicates that said next data string will be subsequently inputted.

3. System according to claim 2, wherein said determining means includes means for storing said first sequence data after said processing means has finished receiving and processing said transmitted data string from said first electronic device.

4. System according to claim 3, wherein said checking means includes means for checking whether said first sequence data stored in said storing means indicates that said next data string will be subsequently inputted.

5. A system according to claim 3, further comprising means for checking whether said received data string is a first transmitted data string, and means for detecting an abnormal condition when said checking means detects that said received data string is said first transmitted data string while said sequence data stored in said storing means indicates that data is being sequentially input.

6. A system according to claim 3, further comprising means for checking whether the received data is sequential data, and means for determining an abnormal condition when said checking means determines that the received data is the sequential data and the sequence data stored in the storing means indicates that data is not sequentially input.

7. A data processing method for sequentially transmitting an instruction and data between first and second electronic devices, said data being divided into a plurality of data strings which are sequentially transmitted, said data processing method comprising the steps of:

transmitting, from said first electronic device, an instruction and a data string of said plurality of data strings together with first sequence data indicating that a next data string will be transmitted subsequently;

processing, in said second electronic device, said data string received from said first electronic device based on said transmitted instruction, and providing resultant data based on said processing, where said processing is performed upon receipt of said transmitted data string and independent of the receipt of further data strings;

determining, in said second electronic device, whether a next data string will be transmitted to said second electronic device after said data string has been received from said first electronic device, said determination being based on said first sequence data;

transmitting, to said first electronic device, said resultant data from said second electronic device together with second sequence data, said second sequence data indicating that said next resultant data will be transmitted to said first electronic device when it is determined, in said determining step, that said next data string will be subsequently transmitted to said second electronic device; and transmitting, from said first electronic device, said instruction and another data string from said plurality of data strings together with said first sequence data.

8. A data processing method for sequentially transmitting an instruction and data between first and second electronic devices, said data being divided into a plurality of data strings which are sequentially transmitted, said data processing method comprising the steps of:

transmitting, from said first electronic device, an encoding instruction and a data string of said plurality of data strings together with first sequence data indicating that a next data string will be transmitted subsequently;

encoding, in said second electronic device, said data string received from said first electronic device based on said encoding instruction, and providing resultant encoded data, where said encoding is performed upon receipt of said transmitted data string and independent of the receipt of further data strings;

determining, in said second electronic device, whether a next data string will be transmitted to said second electronic device after said data string has been received from said first electronic device, said determination being based on said first sequence data;

transmitting, to said first electronic device, said resultant encoded data from said second electronic device together with second sequence data, said second sequence data indicating that next resultant encoded data will be transmitted to said first electronic device when it is determined, in said determining step, that said next data string will be subsequently transmitted to said second electronic device; and transmitting, from said first electronic device, said encoding instruction and another data string from said plurality of data strings together with said first sequence data, upon receipt of said encoded data and said second sequence data.

* * * * *